Jan. 22, 1924.

T. J. COOKSON 1,481,662

STEAM TRAP

Filed Dec. 19, 1918

Inventor
Thomas J. Cookson
By Hull, Smith, Brock & West
Attys.

Patented Jan. 22, 1924.

1,481,662

UNITED STATES PATENT OFFICE.

THOMAS J. COOKSON, OF CLEVELAND, OHIO, ASSIGNOR TO OHIO BLOWER COMPANY, OF CLEVELAND, OHIO, A CORPORATION OF OHIO.

STEAM TRAP.

Application filed December 19, 1918. Serial No. 267,497.

*To all whom it may concern:*

Be it known that I, THOMAS J. COOKSON, a citizen of the United States, residing at Cleveland, in the county of Cuyahoga and State of Ohio, have invented a certain new and useful Improvement in Steam Traps, of which the following is a full, clear, and exact description, reference being had to the accompanying drawings.

This invention relates to improvements in steam traps, the objects being to increase the efficiency of the system by providing a vent through which any air accumulating within the trap will be exhausted at each operation of the trap and without a waste of steam; and to improve, simplify and cheapen the construction of traps of the aforesaid character while maintaining the maximum of efficiency.

As to the structural improvements, the objects sought to be attained thereby may be stated more limitedly as the provision of a discharge connection for the trap involving a union by means of which a valve seat, preferably reversible, is removably held in place; and the provision of a simplified and cheapened bucket float, so constructed as to expedite the assembly of the trap.

Figure 1:
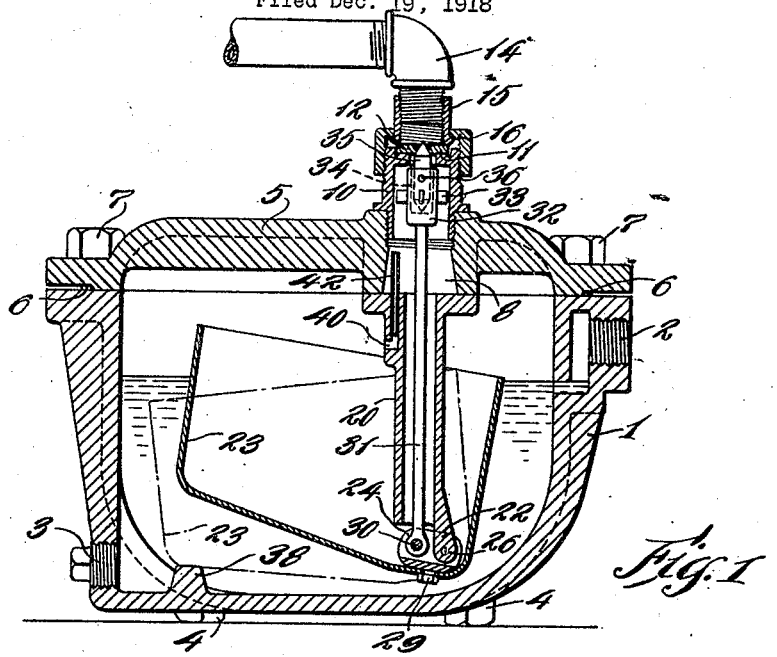
Figure 2:
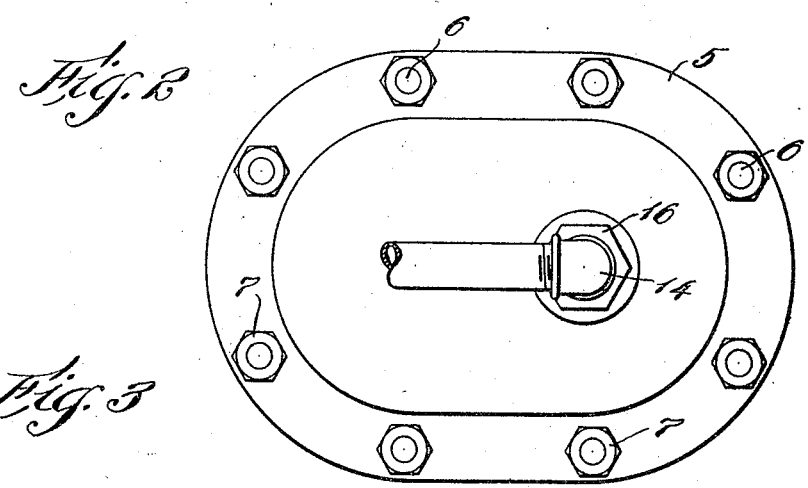
Figure 3:
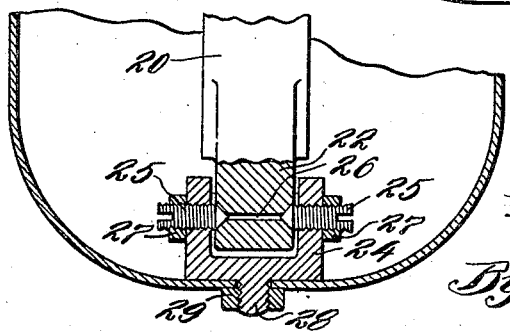

With the foregoing objects in view, and others which will become apparent as this description proceeds, my invention may be defined as consisting of the combinations of elements set forth in the claims annexed hereto and illustrated in the drawing accompanying and forming a part hereof, and wherein Fig. 1 is a sectional side elevation of my improved steam trap; Fig. 2 is a plan thereof; and Fig. 3 a sectional detail on the correspondingly numbered line of Fig. 1.

The open top, box-like casing of the trap is designated 1 and is provided with an inlet 2 adapted to communicate, through suitable connections, with the steam system. A clean-out opening adjacent the bottom of the casing is arranged to be closed by a plug 3. As shown, the casing is formed with integral legs 4.

A cover 5 closes the top of the casing and is attached thereto by suitable means, as bolts 6 and nuts 7. The cover is provided with a vertically disposed hollow boss 8 that is internally threaded at its upper end to receive the lower end of a nipple 10. An internal annular ledge or shoulder 11 is inset from the upper end of the nipple to receive a reversible valve seat 12, the same being in the nature of an apertured disk or washer, the aperture being slightly countersunk on each side of the disk to provide a valve seat. A drain pipe or conduit 14 is adapted to be connected to the nipple 10 by means of a union involving the fitting 15 and nut 16. The inner end of the fitting bears directly upon the valve seat 12 and is adapted to be drawn firmly thereagainst to hold the valve seat upon the shoulder 11, by reason of the interengaging head of the fitting 15 and flange of the nut 16, when the nut is threaded upon the nipple 10.

A tubular column 20 is attached to and depends from the cover 15 with its bore communicating with the passageway of the boss 8, the column terminating at its lower end a short distance above the bottom of the casing 1 where it is formed with a lug 22. A bucket float 23, which is preferably made of sheet metal and drawn to the desired shape, is hingedly connected to the lug 22 through the instrumentality of a member 24. This member is shown as U-shaped in cross-section, and screws 25, having tapered inner ends are threaded through the side flanges of the member and are engaged within correspondingly shaped recesses 26 in the sides of the lug 22, thereby to provide a very sensitive yet firm pivotal connection between the bucket float and column 20. The screws 25 may be locked in properly adjusted position by nuts 27. A threaded stud 28, depending from the member 24, is adapted to be inserted through an aperture in the bottom of the float and to have applied to its protruding end a nut 29. Pivoted upon a pin 30, carried by and extended between the side flanges of the member 24, is the lower end of a stem 31, the upper end whereof is enlarged at 32 and provided with lugs 33 which are arranged to engage the sides of the nipple 10 and thus guide the stem centrally of the nipple. At its upper end the enlargement has an axial recess, as indicated at 34, and a valve body 35 is pivotally supported with one end within the recess, by a pin 36. The ends of the valve body are tapered for cooperation with the correspondingly tapered surfaces of the valve seat 12, and like the seat, is reversible through the removal of the pin 36. The float is limited in the downward direction of its tilting movement by a post 38 which rises from the bottom of the casing 1.

The air vent, hereinbefore referred to, is provided by a port 40 which leads downward from the top of the column 20 through one of the side walls thereof and communicates, through a lateral branch, with the interior of the casing 1 above the maximum water level; and a tube 42, shown as inserted within the upper end of the port, projects well upward within the passageway of the boss 8.

In considering the operation of the trap it will be assumed that the casing 1 is filled to its maximum level with condensation; that air and steam occupy the upper portion of the casing, the air being pocketed between the steam and water. Just as soon as the water of condensation acquires a height sufficient to overflow into and fill the bucket float the bucket will swing to dotted line position, drawing downward the stem 31, thereby removing the valve 35 from the seat 12 and opening the valve wide. The instant the valve is unseated, the air within the trap will rush out through port 40 and escape to the drain 14 before the water reaches the upper end of the column 20, to interfere with the free discharge of the air. The steam, acting upon the water, will depress it in the float and force it upward through the column, expelling all but a small quantity of water from the float, the quantity left accumulating within the depressed or lower side of the float about the open end of the column 20 thereby to constitute a water seal for the column. When the contents of the float have been sufficiently depleted, the buoyancy of the float will cause it to assume its former position and elevate the stem 31 to seat the valve 35.

The advantages arising from the form of outlet connection hereinbefore described are obvious. This connection permits the drain or waste pipe to be placed at any angle with respect to the outlet extension of the casing, thereby adapting itself readily to all conditions or installations; it affords ready access to the valve seat member for the purpose of reversing or renewing it; and it provides a simple, tight, economical, and in all a very satisfactory construction.

The style of float herein disclosed greatly facilitates assembly, as the member 24 may first be pivotally connected to the outlet column and the float then attached to the member by means of the stud 28 and nut 29. Furthermore, the pivotal connections between the float, column, and valve stem being made through the member 24, permits a very light material to be used for the float, as a thin sheet metal drawn to the desired shape. This cheapens and at the same time strengthens the construction over what it would be if made of cast metal as heretofore.

Having thus described my invention, what I claim is:—

1. A trap of the character set forth, comprising a casing from the top wall whereof depends a tubular outlet extension, an open top shell into which the extension projects to within a short distance of the bottom of the shell, a member having laterally spaced flanges within the shell and removably connected thereto, the outlet extension having a lug depending between the flanges of said member, bearing screws threaded through the flanges of said member and entering recesses in the sides of the lug thereby to pivotally connect the float to the extension, a valve controlling the outlet, and operative connections between the valve and said member.

2. In a trap of the character set forth, the combination of a casing having an outlet opening, a waste conduit, a union connecting the conduit and said opening and comprising head and tail pieces applied one to the conduit and the other to the opening, a reversible valve seat engaged between the head and tail pieces, a nut interengaging with the head and tail pieces for drawing said parts together and clamping therebetween said valve seat, a valve body for cooperation with the seat, and float mechanism within the casing operatively connected to the valve body.

In testimony wherof, I hereunto affix my signature.

THOMAS J. COOKSON.